US011117306B2

(12) United States Patent
Welb

(10) Patent No.: US 11,117,306 B2
(45) Date of Patent: *Sep. 14, 2021

(54) SCREW MACHINE AND METHOD FOR THE PROCESSING OF MATERIAL TO BE PROCESSED

(71) Applicant: Coperion GmbH, Stuttgart (DE)

(72) Inventor: Sören Welb, Ilsfeld (DE)

(73) Assignee: Coperion GmbH, Stuttgart (DE)

( * ) Notice: Subject to any disclaimer, the term of this patent is extended or adjusted under 35 U.S.C. 154(b) by 531 days.

This patent is subject to a terminal disclaimer.

(21) Appl. No.: 15/773,738

(22) PCT Filed: Sep. 27, 2016

(86) PCT No.: PCT/EP2016/072946
§ 371 (c)(1),
(2) Date: May 4, 2018

(87) PCT Pub. No.: WO2017/076556
PCT Pub. Date: May 11, 2017

(65) Prior Publication Data
US 2018/0326646 A1    Nov. 15, 2018

(30) Foreign Application Priority Data
Nov. 5, 2015   (DE) .................... 10 2015 221 758.2

(51) Int. Cl.
*B29C 48/82*    (2019.01)
*B29C 48/84*    (2019.01)
(Continued)

(52) U.S. Cl.
CPC .............. *B29C 48/82* (2019.02); *B29C 45/62* (2013.01); *B29C 48/2565* (2019.02);
(Continued)

(58) Field of Classification Search
CPC . B29C 48/82; B29C 48/6803; B29C 48/2565; B29C 48/834; B29C 48/682; B29C 48/509; B29C 48/92; B29C 48/57
See application file for complete search history.

(56) References Cited

U.S. PATENT DOCUMENTS

2003/0121908 A1    7/2003  Pilavdzic et al.
2004/0074092 A1*   4/2004  Behling .................. C21D 9/08
                                                         29/888.06
(Continued)

FOREIGN PATENT DOCUMENTS

CN    200 971 391 Y    11/2007
CN    202 846 846 U     4/2013
(Continued)

OTHER PUBLICATIONS

English translation of WO 2005/053826 (Year: 2005).*

*Primary Examiner* — Timothy Kennedy
*Assistant Examiner* — Olukorede Esan
(74) *Attorney, Agent, or Firm* — McGlew and Tuttle, P.C.

(57) ABSTRACT

A screw machine includes an inductive heating device for processing of material to be processed. The inductive heating device is used to heat the material in a heating zone. In the heating zone, at least one housing portion is made of an electromagnetically transparent material at least partly, the material being non-magnetic and electrically non-conductive, whereas at least one treatment element shaft is made of an electrically conductive material at least partly. The inductive heating device includes at least one coil formed integrally with a component of the at least one housing portion, in particular in such a way as to form a hybrid component. During the processing of the material, the inductive heating device generates an alternating magnetic field that produces eddy current losses in the at least one treatment element (Continued)

shaft, the eddy current losses leading to a temperature increase of the at least one treatment element shaft.

22 Claims, 4 Drawing Sheets

(51) Int. Cl.
| | |
|---|---|
| *B29C 48/54* | (2019.01) |
| *B29C 48/57* | (2019.01) |
| *B29C 48/92* | (2019.01) |
| *H05B 6/10* | (2006.01) |
| *B29C 48/40* | (2019.01) |
| *B29C 48/505* | (2019.01) |
| *B29C 48/68* | (2019.01) |
| *B29C 48/80* | (2019.01) |
| *B29C 48/25* | (2019.01) |
| *B29C 45/62* | (2006.01) |
| *B29C 48/03* | (2019.01) |
| *B29C 45/74* | (2006.01) |

(52) U.S. Cl.
CPC .......... *B29C 48/402* (2019.02); *B29C 48/509* (2019.02); *B29C 48/54* (2019.02); *B29C 48/57* (2019.02); *B29C 48/682* (2019.02); *B29C 48/6803* (2019.02); *B29C 48/834* (2019.02); *B29C 48/845* (2019.02); *B29C 48/92* (2019.02); *H05B 6/107* (2013.01); *B29C 45/74* (2013.01); *B29C 48/03* (2019.02); *B29C 2948/9238* (2019.02); *B29C 2948/92209* (2019.02); *B29C 2948/92542* (2019.02); *B29C 2948/92704* (2019.02); *B29C 2948/92876* (2019.02); *B29C 2948/92885* (2019.02)

(56) References Cited

U.S. PATENT DOCUMENTS

| | | | |
|---|---|---|---|
| 2004/0084171 A1* | 5/2004 | Akers | B22D 17/007 164/113 |
| 2008/0248152 A1* | 10/2008 | Samann | B29C 48/767 425/208 |
| 2015/0165665 A1 | 6/2015 | Guichard et al. | |
| 2016/0279854 A1 | 9/2016 | Fitzpatrick | |

FOREIGN PATENT DOCUMENTS

| | | | | |
|---|---|---|---|---|
| CN | 204 547 024 U | 8/2015 | | |
| DE | 11 05 143 B | 4/1961 | | |
| DE | WO 2005/053826 | * | 6/2005 | ............ B29C 45/46 |
| DE | 10 2014 206 638 A1 | 10/2015 | | |
| EP | 2 692 505 A1 | 2/2014 | | |
| WO | 2005/053826 A2 | 6/2005 | | |
| WO | 2015/154973 A1 | 10/2015 | | |

\* cited by examiner

SCREW MACHINE AND METHOD FOR THE PROCESSING OF MATERIAL TO BE PROCESSED

CROSS REFERENCE TO RELATED APPLICATIONS

This application is a United States National Phase Application of International Application PCT/EP2016/072946, filed Sep. 27, 2016, and claims the benefit of priority under 35 U.S.C. § 119 of German Patent Application Serial No. DE 10 2015 221 758.2, filed on Nov. 5, 2015, the entire contents of which are incorporated herein by reference.

FIELD OF THE INVENTION

The invention relates to a screw machine with a housing, which comprises a plurality of interconnected housing portions arranged in succession in a conveying direction, at least one housing bore formed in the housing, a feed opening leading into the at least one housing bore, at least one treatment element shaft arranged in the at least one housing bore in such a way as to be drivable for rotation about at least one rotational axis, an inductive heating device configured to form a heating zone with at least one coil, wherein the at least one coil surrounds the at least one treatment element shaft, at least one housing portion in the heating zone comprises a component, which is made of a non-magnetic and electrically non-conductive material, and the at least one treatment element shaft comprises an electrically conductive material at least in the heating zone. The invention further relates to a method for the processing of material to be processed.

BACKGROUND OF THE INVENTION

A screw machine for the processing of plastic material is known from DE 10 2014 206 638 A1, said screw machine comprising an inductive heating device for heating the plastic material in a heating zone. The coil of the inductive heating device is arranged in a receiving space of a housing portion of the screw machine. The receiving space is defined by an inner sleeve of a ceramic material and an outer shell of a metal material. The inductive heating device provides an energy input into the treatment element shafts such that the temperature thereof increases as a result of said energy input, causing the material to be processed to melt. The conductor forming the coil has a hollow cross-sectional shape and defines a cooling duct allowing the conductor to be cooled if necessary. Conductors of this type are usually formed by bending a flat copper material, which is then soft-soldered to obtain the hollow cross-sectional shape.

SUMMARY OF THE INVENTION

The invention is based on the object of further developing a screw machine in such a way that an improved energy efficiency and mechanical stability is obtained in a simple manner.

This object is achieved by a screw machine with a housing, which comprises a plurality of interconnected housing portions arranged in succession in a conveying direction, at least one housing bore formed in the housing, a feed opening leading into the housing bores, at least one treatment element shaft arranged in the at least one housing bore in such a way as to be drivable for rotation about at least one rotational axis, an inductive heating device configured to form a heating zone with at least one coil, wherein the at least one coil surrounds the at least one treatment element shaft, at least one housing portion in the heating zone comprises a component, which is made of a non-magnetic and electrically non-conductive material, and the at least one treatment element shaft comprises an electrically conductive material at least in the heating zone, wherein the at least one coil is integrated in the component, and at least one cooling duct is integrated in the component. Due to the fact that the at least one coil of the inductive heating device is integrated in the electromagnetically transparent component of the at least one housing portion associated thereto and is disposed in the heating zone, the windings of the at least one coil can be arranged much closer to the at least one treatment element shaft to be heated. Although the at least one coil is arranged close to the at least one treatment element shaft, which results in a low material thickness of the component in the region of the conductor of the at least one coil, the mechanical stability of the at least one housing portion is improved because of said integrated design, which prevents the formation of hollow spaces in particular between the windings of the coil, thus enabling the component to absorb and dissipate radially acting forces over a large surface area thereof. As a result of this integrated design, the efficiency or the energy efficiency of the screw machine on the one hand and the mechanical stability in the region of the heating zone on the other is improved.

The at least one cooling duct is integrated in the component. This means that the conductor forming the at least one coil does not have a cooling duct, in other words it does not have a hollow cross-section. The conductor is therefore free of hollow spaces and joints and/or soldering material. Due to the fact that the conductor does not have any joints and is in particular free from soldering material, the at least one coil can be operated at a comparatively higher power and/or temperature as the maximum permissible power and/or temperature is not limited by a maximum permissible temperature of a joint material, in particular the soldering material. Due to the fact that the at least one cooling duct is integrated in the component, the at least one cooling duct can be produced in a simple manner.

As the inductive heating device interacts with the at least one treatment element shaft in the heating zone and the at least one treatment element shaft is in close contact with the material to be processed and is surrounded by the material to be processed over a large surface area thereof, the material to be processed is heated and molten in a simple and effective manner. The efficient energy input into the material to be processed is due to the fact that the component of the at least one housing portion in the heating zone is made of an electromagnetically transparent material, which is non-magnetic and electrically non-conductive. For the sake of clarity, the at least one housing portion in the heating zone is hereinafter also referred to as heating zone housing portion. The electromagnetically transparent material does not interact with the inductive heating device. In particular, the electromagnetically transparent material is non-ferromagnetic. Preferably, a plurality of heating zone housing portions, in particular all heating zone housing portions, are made—in the heating zone—of the electromagnetically transparent material at least partly. Contrary, the at least one treatment element shaft is made of an electrically conductive material in the heating zone at least partly, with the result that the inductive heating device causes eddy currents to be induced in the at least one treatment element shaft, which in turn causes ohmic eddy current losses to develop that lead to a temperature increase of the at least one treatment element shaft. Via the at least one heated treatment element shaft, the energy provided by the inductive heating device is introduced into the material to be processed easily and efficiently and with a minimum of losses. The electrically conductive material is in particular ferrous and ferromagnetic. This allows the at least one treatment element shaft to be heated efficiently by ohmic eddy current losses and hysteresis losses. The material to be processed is in particular a plastic material or a metal material, for example a metallic bulk material.

The electromagnetically transparent material of the at least one heating zone portion is, for example, a non-metal material such as a ceramic and/or fiber-reinforced material. Contrary thereto, the electrically conductive material of the at least one treatment element shaft is in particular a metal material such as steel.

In order to generate the alternating magnetic field, the inductive heating device is operable in particular at a frequency f, the frequency f being such that 1 kHz≤f≤50 kHz, in particular 5 kHz≤f≤45 kHz, and in particular 10 kHz≤f≤40 kHz. If the inductive heating device is operated at a frequency f in this first frequency range, a high input of energy into the at least one treatment element shaft is achieved in an efficient manner. As the at least one heating zone housing portion is made of the non-magnetic and electrically non-conductive material, an energy input into the at least one heating zone housing portion is effectively prevented in this frequency range, thus enabling an efficient input of energy into the at least one treatment shaft. As an alternative or in addition thereto, the inductive heating device can be operated at a frequency f in a second frequency range, the frequency f being such that 140 kHz≤f≤360 kHz, in particular 150 kHz≤f≤350 kHz, and in particular 160 kHz≤f≤340 kHz. Operating the inductive heating device in the two frequency ranges allows an excitation or heating in various penetration depths. The inductive heating device is operated in the first frequency range and the second frequency range in particular alternately. This provides an efficient manner of ensuring a high energy input. The inductive heating device allows the mechanical forces acting in the screw machine and, consequently, the wear thereof, to be reduced significantly.

Preferably, the screw machine is configured as a multi-shaft screw machine, in particular as a twin-shaft screw machine. The multi-shaft screw machine has a plurality of housing bores formed in the housing and associated treatment element shafts arranged in the respectively associated housing bore in such a way as to be drivable for rotation about an associated rotational axis. The treatment element shafts are drivable for rotation in particular in the same direction. The treatment element shafts are preferably configured as closely intermeshing pairs.

The coil axis or longitudinal center axis of the at least one coil is arranged substantially towards the rotational axis or the rotational axes of the at least one treatment element shaft. Preferably, a longitudinal center axis of the at least one coil is parallel to the rotational axis of the at least one treatment element shaft. The at least one treatment element shaft is arranged in an inner space of the at least one coil. The at least one coil is therefore arranged in the manner of a Helmholtz coil, with the treatment element shafts forming a core. The field lines of the alternating magnetic field are therefore concentrated in the inner space and in the at least one treatment element shaft so a high energy input into the treatment element shafts is possible in a simple manner. The length of the heating zone in the conveying direction is adjustable via the length of the at least one coil and/or the number of the coils. The length of the at least one coil is adjustable in particular via the number of its windings.

As the at least one heating zone housing portion in the inner space of the at least one coil is made exclusively of the non-magnetic and electrically non-conductive material, the energy provided by the inductive heating device is introduced into the at least one treatment element shaft as efficiently as possible.

Magnetic and/or electrically conductive material of the screw machine, which would be located between the at least one coil and the at least one treatment element shaft, would absorb electromagnetic energy provided by the inductive heating device so energy provided by the inductive heating device could only be introduced into the at least one treatment element shaft with a significant amount of losses. This is effectively prevented by the screw machine according to the invention. Preferably, the material of the at least one heating zone housing portion arranged in the inner space is a ceramic and/or fiber-reinforced material, such as an oxide ceramic fiber-reinforced composite. Oxide ceramic fiber-reinforced composites combine positive properties of metals and ceramics, such as electromagnetic transparency, electric and thermal insulating ability, ductile and non-brittle breaking behavior, high tensile and bending stiffness, oxidation and corrosion resistance, high temperature stability up to temperatures above 1300° C., and thermal shock resistance. As the alternating magnetic field of the at least one coil produces only a low energy input into electrically conductive and/or magnetic components outside the inner space, the areas of the at least one heating zone housing portion disposed outside the inner space can be made of an electrically conductive and or magnetic material. Alternatively, the areas of the at least one heating zone housing portion disposed outside the inner space may also be made of a non-magnetic and electrically non-conductive material.

The at least one treatment element shaft preferably comprises a plurality of treatment elements, which are arranged non-rotationally and successively on at least one shaft associated thereto. At least one treatment element in the heating zone preferably comprises a metallic heating layer, which forms a surface of the at least one treatment element. Preferably, the at least one treatment element comprises an insulating layer used to thermally insulate the heating layer from the shaft. The at least one treatment element being provided with an insulating layer prevents thermal losses of the at least one heated treatment element in the direction of the shaft, which would then not be available for heating the material to be processed. The insulating layer is made of a ceramic material, for example. The electrically conductive material forms at least the heating layer of the at least one treatment element, the heating layer forming a surface that is in contact with the material to be processed. Preferably, a plurality of treatment elements, in particular all treatment elements in the heating zone are made of the electrically conductive material. The at least one treatment element is configured as a screw element and/or a kneading element. The kneading element may be a single kneading disk or a single-part kneading block made of a plurality of interconnected kneading disks.

The at least one treatment element is made of a composite material, for example. The at least one treatment element being made of the composite material has a number of different properties. The metal material of the outer heating layer ensures a temperature increase of the heating layer caused by the alternating magnetic field, allowing the material to be processed to be heated directly via the heating layer. The insulating layer, which is disposed between the outer heating layer and an inner torque transmitting layer, minimizes the thermal losses as the heat of the heating layer does not get lost in the direction of the inner torque transmitting layer and the shaft on which the at least one treatment element is arranged. The inner torque transmitting layer has a high mechanical stability so a torque of the shaft can be safely transmitted to the at least one treatment element. In particular, the insulating layer ensures that the inner torque transmitting layer is not weakened by thermal losses. The material of the insulating layer is in particular a ceramic material. The at least one treatment element may for example be made of ceramic and metal powders, which are sintered in a corresponding mold at approximately 1,400° C. so as to form a composite material or a composite body. The production of metal ceramic composite bodies is known. Seen in cross-section, in other words perpendicular to the respective rotational axis, the layers have a closed, in particular annular shape and surround the rotational axis of the at least one treatment element shaft, with the result that the insulating layer insulates the heating layer from the shaft across the entire surface thereof. Furthermore, the heating layer has a maximum surface area, thus ensuring a good heat transfer from the heating layer to the material to be processed.

A screw machine configured such that the at least one coil defines an inner space and the at least one housing portion is made exclusively of the non-magnetic and electrically non-conductive material in the inner space ensures as simple manner of providing an improved mechanical stability. As the windings of the at least one coil are completely surrounded by the component when seen in cross-section, forces acting on the component in a direction radial to the at least one rotational axis can be dissipated over a large surface area of the component. In particular, forces acting in the radial direction can also be dissipated via the conductor, forming the windings, of the at least one coil.

A screw machine configured such that the at least one coil forms in each case at least two terminals and the terminals are accessible from an outside of the component ensures a simple manner of providing an improved energy efficiency. The terminals provide a simple manner of applying electrical contact to the at least one coil integrated in the component, which is therefore operable in a simple manner.

A screw machine configured such that the at least one cooling duct is formed at a side of the at least one coil facing away from the at least one housing bore ensures a simple manner of providing an improved energy efficiency. As the at least one cooling duct is formed on the side of the at least one coil or the associated conductor facing away from the at housing bore, this enables the conductor—because of its temperature—to dissipate ohmic heat losses in the direction of the at least one housing bore, which are then available in an efficient manner to additionally heat and melt the material to be processed.

A screw machine configured such that the at least one coil and the component are configured such as to form a hybrid component ensures a simple manner of providing an integrated design comprising the at least one coil and the associated component. The hybrid component can be produced in layers, for example by additive manufacturing and a subsequent sintering process. Additive manufacturing processes or 3D printing processes are known. The conductor of the at least one coil is made in layers of an electrically conductive material, in particular of a metal material, a metallic material composition and/or an electrically conductive ceramic material. Contrary thereto, the component surrounding the conductor is made in layers of the non-magnetic and electrically non-conductive material, for example a ceramic material. The hybrid component is therefore made of an electrically conductive material and the electromagnetically transparent material, in other words the non-magnetic and electrically non-conductive material. Preferably, the hybrid component is made of a metal material and a ceramic material. In terms of their respective shrinkage behavior, the electrically conductive material and the electromagnetically transparent material are in particular selected in such a way that after sintering, the hybrid component is substantially free of cracks. In relation to the lower volume loss, a difference in volume loss of the materials during sintering is in particular at most 10%, in particular at most 5%, and in particular at most 2%. Furthermore, the materials are in particular selected such that their coefficients of thermal expansion are substantially equal. In relation to the lower coefficient of thermal expansion, a difference between the coefficients of thermal expansion is in particular at most 10%, in particular at most 5%, and in particular at least 2%. At a transition between the materials, a buffer layer of a compensation material can be integrated to compensate for different shrinkage behaviors and/or different coefficients of thermal expansion. In particular, the layered production process provides a simple manner of producing and integrating at least one cooling duct in the component. Said additive manufacturing process allows reinforcing particles, in particular reinforcing fibers, to be introduced into the material to improve the mechanical stability thereof. In addition thereto, ferrites can be introduced into the component to increase and/or direct the alternating magnetic field. The additive manufacturing process also allows the windings of the at least one coil to be arranged exactly and/or at a small distance from the at least one housing bore. In particular when seen in the direction of the at least one rotational axis, the windings of the at least one coil may have a shape that corresponds to the outer contour of the at least one housing bore. In a twin-shaft screw machine, the windings may have the shape of a horizontal figure eight when seen in the direction of the rotational axes. The same applies to a cooling duct integrated in the hybrid component.

A screw machine configured such that the component forms an inner sleeve, which defines the at least one housing bore in the heating zone at least partly, ensures a simple manner of providing an improved energy input. Due to the fact that the component forms an inner sleeve, the at least one coil is arranged close to the at least one treatment element shaft. Furthermore, forces resulting from the processing of the material can be directly absorbed and dissipated by the component. The inner sleeve is preferably made exclusively of the non-magnetic and electrically non-conductive material.

A screw machine configured such that the at least one coil comprises an associated conductor and in a region of the conductor perpendicular to the at least one rotational axis, the component has a material thickness D, with 5 mm≤D≤50 mm, in particular 10 mm≤D≤40 mm, and in particular 15 mm≤D≤30 mm ensures a simple manner of providing an improved energy input. The smaller the material thickness of the component, then the higher and more efficient the energy input into the at least one treatment element shaft as the conductor of the at least one coil is arranged close to the at least one treatment element shaft. Due to the fact that the at least one coil is integrated in the component, a high mechanical stability is achieved despite the small material thickness D.

A screw machine configured such that the at least one coil comprises an associated conductor and the conductor has a cross-section free of hollow spaces, which is formed linearly in particular at least partly, ensures a simple manner of providing an improved energy input. Because of its cross-sectional shape, which is in particular free of hollow spaces, the conductor has a compact design, allowing it to be arranged close to the at least one treatment element shaft. Due to its cross-sectional shape, which is free of hollow spaces, the conductor has in particular no joints either when seen in cross-section, in other words, it is free of joints. Therefore, the inductor is free of joint material, in particular of soldering material, with the result that the thermal load capacity of the conductor is not limited by the joint material such as soft solder. Preferably, the conductor has a non-round cross-sectional shape. For example, the conductor has a rectangular cross-sectional shape, which may be rounded at the corners if necessary. As the conductor has a linear cross-sectional shape at least partly when seen in cross-section, the conductor may be arranged close to the at least one treatment element shaft when seen in cross-section. The side of the cross-sectional shape having the greater dimension is arranged such as to face the at least one treatment element shaft.

A screw machine configured such that the at least one coil defines an inner space and the at least one housing portion is made exclusively of the non-magnetic and electrically non-conductive material in the inner space ensures a simple manner of providing an efficient energy input. As the at least one heating zone housing portion in the inner space of the at least one coil is made exclusively of the non-magnetic and electrically non-conductive material, the energy provided by the inductive heating device is introduced efficiently into the at least one treatment element shaft. Preferably, the component in the inner space of the at least one coil is made exclusively of the non-magnetic and electrically non-conductive material.

A screw machine configured such that the at least one housing portion comprises at least one outer part and the component is supported against the at least one outer part ensures a simple manner of providing an im-proved mechanical stability. As the component is supported against the at least one outer part over a large surface-area thereof, this ensures a high mechanical stability of the component, in particular of the inner sleeve. The at least one outer part is configured as an outer jacket, for example. The outer jacket is in particular composed of multiple parts, in other words of a plurality of outer parts. The component is supported against the at least one outer part in particular in the region of the windings and in the region between the windings of the at least one coil. Therefore, the component is able to dissipate forces occurring during processing in particular in a radial direction to the at least one outer part. This effectively prevents the component from breaking. The component is preferably made of a ceramic and/or fiber-reinforced material. The at least one outer part is preferably made of a metal material so the at least one outer part possesses a sufficient stability to absorb forces. Preferably, the at least one outer part is clamped with the component in such a way that a force acts on the component from outside. Preferably, the at least one outer part is provided with through-holes providing access to terminals of the at least one coil and to the at least one cooling duct.

A screw machine configured such that a flow line and a return flow line of a cooling device are connected to the cooling duct, and such that a flow temperature in the flow line and/or a return flow temperature in the return flow line are measurable by means of at least one temperature measuring sensor ensures an improved energy input. If necessary, the at least one coil is cooled by means of a coolant. The coolant is in particular water or oil. The at least one temperature measuring sensor allows the cooling of the at least one coil to be optimized. Preferably, the at least one coil is cooled such that a temperature of the at least one coil is above a melting temperature of the material to be processed and the material to be processed does not reach its decomposition temperature. In this manner, the ohmic heat loss generated by the at least one coil can be used to heat and melt the material to be processed. A control device actuates the inductive heating device, in other words the energy supply device and/or the cooling device, in response to the measured flow temperature and/or the measured return flow temperature and/or a measured temperature of the material to be processed. This ensures that the material to be processed is, on the one hand, heated and molten from inside via the at least one heated treatment element shaft and, on the other, from outside by via the heat loss of the at least one coil.

A screw machine configured such that the inductive heating device comprises an energy supply device to operate the at least one coil, and such that the energy supply device provides an alternating voltage and/or an alternating current, in particular with an adjustable frequency and/or an adjustable amplitude ensures a simple manner of providing an alternating magnetic field by means of the inductive heating device. The energy supply device in particular comprises a frequency converter, which allows a frequency f and/or an amplitude of an alternating voltage and/or of an alternating current to be adjusted. For example, the frequency f allows the penetration depth of the alternating electromagnetic field into the at least one treatment element shaft to be adjusted. Preferably, the alternating electromagnetic field penetrates into the heating layer substantially exclusively or predominantly. The inductive heating device and the energy supply device are operated in particular at a frequency f, the frequency f being such that
1 kHz≤f≤50 kHz, in particular 5 kHz≤f≤45 kHz, and in particular 10 kHz≤f≤40 kHz and/or
140 kHz≤f≤360 kHz, in particular 150 kHz≤f≤350 kHz, and in particular 160 kHz≤f≤340 kHz.

A screw machine comprising a temperature measuring sensor configured to measure a temperature of the material to be processed and a control device configured to control the inductive heating device in response to the measured temperature of the material to be processed ensures a controlled temperature increase of the material to be processed in a simple manner. Via the temperature, measured by means of the temperature measuring sensor, of the material to be processed, the power of the inductive heating device can be adjusted in response to said measured temperature. For example, the control device compares the measured temperature with a desired nominal temperature required to melt the material to be processed, and changes the power of the inductive heating device if necessary. The control device in particular adjusts a frequency f and/or an amplitude of an alternating voltage and/or of an alternating current used to operate the inductive heating device. For example, the inductive heating device comprises an energy supply device with a frequency converter.

A screw machine configured such that the at least one coil comprises a conductor, which forms a plurality of windings and terminals arranged at the ends thereof, and such that the windings have a shape of a horizontal figure eight and are therefore adapted to two housing bores ensures an improved energy efficiency due to the windings adapted to the housing bores.

A screw machine configured such that the at least one cooling duct has a shape of a horizontal figure eight and is therefore adapted to two housing bores and/or to windings of the at least one coil ensures an improved energy efficiency due to the at least one cooling duct adapted to the housing bores and/or to the windings.

The invention is further based on the object of further developing a method in such a way that an improved energy input into the material to be processed is achieved in a simple and reliable manner.

This object is achieved according to the invention by a method for the processing of material to be processed, comprising the steps of providing a screw machine according to the invention, feeding a material to be processed into the at least one housing bore, heating the at least one treatment element shaft by means of the inductive heating device, and heating the material to be processed on the at least one heated treatment element shaft, in particular until the material has molten at least partly in the heating zone. The advantages of the method according to the invention are the same as the advantages, already described above, of the screw machine according to the invention.

A method configured such that the inductive heating device is operated in such a way that a temperature of the at least one coil is above a melting temperature of the material to be processed, in particular above 100° C., in particular above 160° C., and in particular above 230° C. ensures a simple manner of providing an improved energy input. Due to the fact that the inductive heating device is operated in such a way that a temperature of the at least one coil is above the melting temperature of the material to be processed, the heat generated by the at least one coil due to ohmic losses can be used to heat and melt the material to be processed. For this purpose, the heat loss generated by the at least one coil flows in the direction of the at least one housing bore and is transferred to the material to be processed via the component. The material to be processed is therefore heated from inside via the at least one heated treatment element shaft and from outside via the at least one component heated by the at least one coil.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
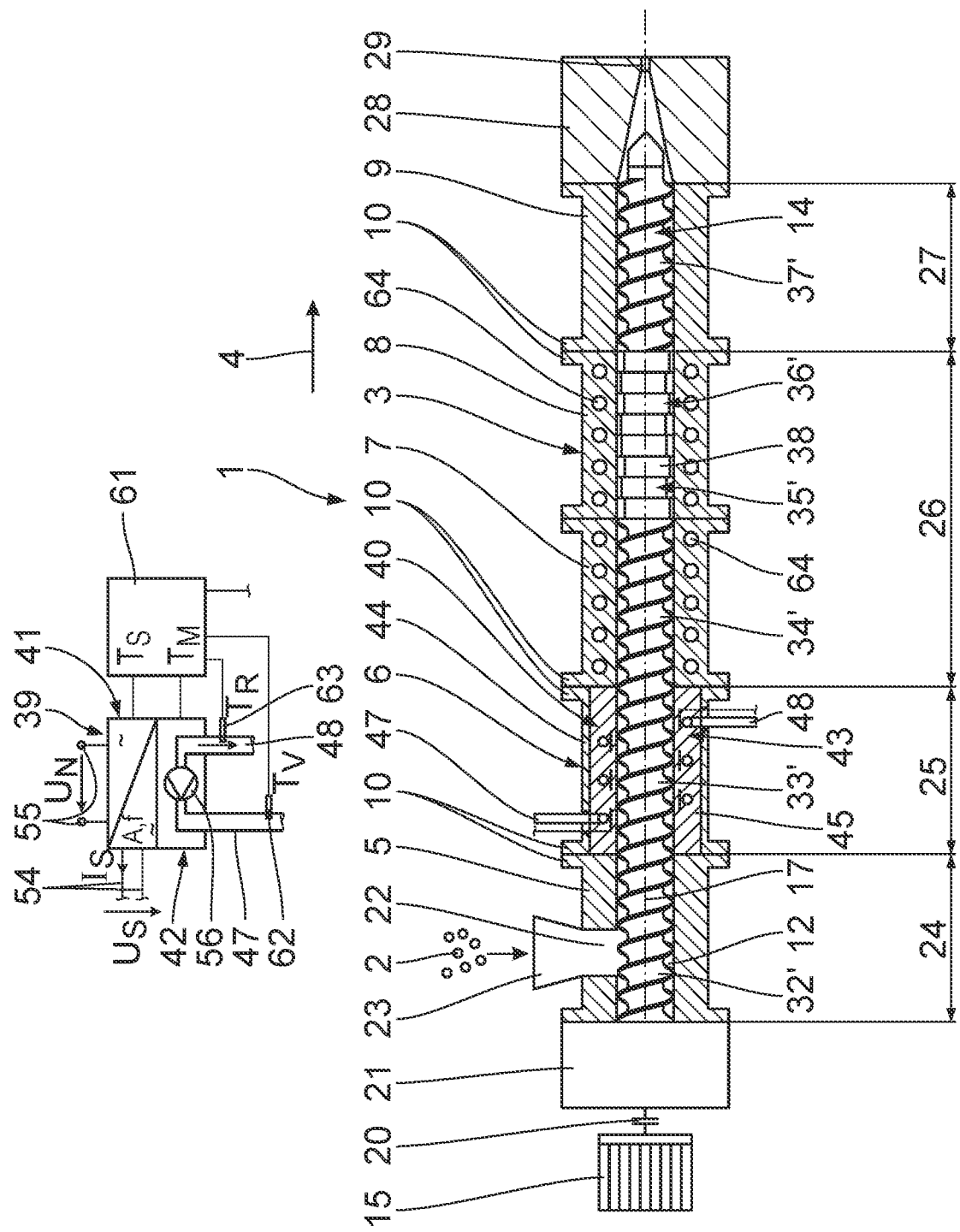
FIG. 1 is a partly sectional view of a multi-shaft screw machine for the processing of material to be processed.

A multi-shaft screw machine is used for the processing of a material 2 to be processed. The material 2 to be processed is a plastic material, for example.

The screw machine 1 has a housing 3 made of a plurality of housing portions 5 to 9, also referred to as housing units, arranged in succession in a conveying direction 4 of the plastic material 2. The housing portions 5 to 9 are connected to each other via flanges 10 arranged at the ends thereof in such a way as to form the housing 3.

In the housing 3, two housing bores 11, 12 are formed, which are parallel to one another and penetrate one another in such a way as to have the shape of a horizontal figure eight when seen in cross-section. In the housing bores 11, 12, two treatment element shafts 13, 14 are arranged concentrically, which are drivable for rotation about associated rotational axes 16, 17 by means of a drive motor 15. The treatment element shafts 13, 14 are driven about the rotational axes 16, 17 in the same direction, i.e. in the same rotational directions 18, 19. A coupling 20 and branching gear unit 21 are arranged between the drive motor 15 and the treatment element shafts 13, 14.

In the first housing portion 5 adjacent to the branching gear unit 21, a feed opening 22 is formed through which the plastic material is feedable into the housing bores 11, 12. For the feeding through the feed opening 22, a material feeder 23 configured as a hopper is arranged on the first housing portion 5.

The screw machine 1 has an inlet zone 24, a heating zone 25, a homogenizing zone 26 and a pressure build-up zone 27, which are arranged in succession in the conveying direction 4. At the last housing portion 9, the housing 3 is closed by a nozzle plate 28 provided with a discharge opening 29.

The treatment element shafts 13, 14 are formed by shafts 30, 31 and treatment elements 32 to 37 or 32' to 37', respectively, arranged thereon. The treatment elements 32 to 37 arranged on the first shaft 30 and the treatment elements 32' to 37' arranged on the second shaft 31 correspond to each other, with the reference numerals of the treatment elements 32' to 37' arranged on the second shaft 31 having an additional ', allowing them to be differentiated from the treatment elements 32 to 37 arranged on the first shaft 30.

The treatment elements 32 to 37 and 32' to 37' are configured as closely intermeshing pairs, in other words the engage one another. The treatment elements are configured as screw elements 32, 32' and 33, 33' in the inlet zone 24 and in the heating zone 25. In the homogenizing zone 26 arranged downstream thereof, the treatment elements are configured as screw elements 34, 34' and kneading elements 35, 36 as well as 35', 36'. Each of the kneading elements 35, 36 and 35', 36' is configured as a kneading block, in other words they are configured in one piece. The kneading elements 35, 36 and 35', 36' each have a plurality of kneading disks 38, 38', which are arranged at an angular offset to each other and are connected to each other. In the pressure build-up zone 27, the treatment elements are again configured as screw elements 37, 37'.

The treatment elements 32 to 37 and 32' to 37' are arranged on the associated shafts 31, 31 in non-rotational manner. To this end, the shafts 30, 31 have an outer profile A that engages a corresponding inner profile I of the treatment elements 32 to 37 and 32' to 37'.

In order to melt the plastic material 2 in the heating zone 25, the screw machine 1 has an inductive heating device 39. The inductive heating device 39 comprises a coil 40, an associated energy supply device 41 and a cooling device 42.

The housing portion 6 located in the heating zone 25 will hereinafter also be referred to as heating zone housing portion. The heating zone housing portion 6 comprises a component 45 configured as an inner sleeve and an outer part 44 in which the component is arranged by clamping. Said clamping arrangement can be achieved by means of an interference fit, for example. The outer part 44 is in particular configured as an outer jacket. Alternatively, a plurality of outer parts 44 may be provided, which are interconnected to form a multi-part outer jacket. At the ends of the housing portion 6, the flanges are formed on the outer part 44. The housing bores 11, 12 are defined by the component 45.

The coil 40 and the component 45 are designed as an integral unit so as to form a hybrid component 43. The hybrid component 43 is produced in layers, for example, by means of an additive manufacturing process.

The coil 40 has a longitudinal center axis 49 and defines an inner space 50. The longitudinal center axis 49 extends essentially parallel to the rotational axes 16, 17 such that the treatment element shafts 13, 14 run through the inner space 50 of the coil 40. The coil 40 therefore surrounds the treatment element shafts 13, 14 in the heating zone 25. The coil 40 comprises a conductor 51, which forms a plurality of windings W and terminals 46 arranged at the ends thereof. The terminals 46 are guided from each winding W formed at a respective end to an outside of the component 45 so as to be accessible there. The integral design of the coil 40 and the component 45 ensures that the windings W are fully surrounded by the component 45. In particular, the conductor 51 forming the windings W bears against the component 45 when seen in a radial direction relative to the respective rotational axis 16, 17. Seen in the rotational axes 16, 17, the windings W have the shape of a horizontal figure eight and are therefore adapted to the housing bores 11, 12, in other words to the shape thereof.

A cooling duct 52, which is part of the cooling device 42, is integrated in the component 45. The cooling duct 52 is formed at a side of the coil 40, in particular of the windings W, that faces away from the housing bores 11, 12. The cooling duct 52 has a helical shape to match the shape of the coil 40 and is connected to a flow line 47 and a return flow line 48 on the outside of the component 45. During additive manufacturing of the hybrid component 43, for example, the cooling duct 52 is automatically produced as well. Seen in the direction of the rotational axes 16, 17, the cooling duct 52 has the shape of a horizontal figure eight and is therefore adapted to the housing bores 11, 12 and/or to the windings W of the coil 40.

The outer part 44 is provided with a respective through hole at each end through which the electrical connection lines 54 to the terminals 46 and the flow line 47 and the return flow line 48 to the cooling duct 52 are guided. Outside the heating zone housing portion 6, the cooling duct 52 is connected, via the flow line 47 and the return flow line 48, to a coolant pump 56, which allows a coolant to be pumped through the cooling duct 52. The coolant pump 56 is part of the cooling device 42. A preferred coolant is water or oil.

The coil 40 is connected to the energy supply device 41, which supplies the coil 40 with an alternating voltage $U_S$ and/or an alternating current $I_S$ with an adjustable frequency f and/or an adjustable amplitude A. The energy supply device 41 is in particular a frequency converter. The energy supply device 41 is connected, via terminals 55, to a mains power supply that provides a mains voltage $U_N$.

Heating the plastic material 2 is carried out by means of the treatment elements 33 and 33'. For simple and efficient heating, the treatment elements 33, 33' have a three-layer design. An inner torque transmitting layer 57 is surrounded by an insulating layer 58, which in turn is surrounded by an outer heating layer 59. The insulating layer 58 of the respective treatment element 33, 33' thermally insulates the associated heating layer 59 from the associated torque transmitting layer 57 and the associated shaft 30 or 31, respectively. To this end, the respective insulating layer 58 is provided over the entire circumference and the entire length of the torque transmitting layer 57. The respective insulating layer 58 therefore surrounds the associated rotational axis 16 or 17, respectively. The respective heating layer 59 forms a surface of the treatment element 33 or 33'.

In order to form the layers 57 to 59, the treatment elements 33, 33' are made of a metal ceramics composite material. The respective torque transmitting layer 57 is made of a first metal $M_1$ while the respective heating layer 59 is made of a second metal material $M_3$, whereas the respective insulating layer 58 arranged therebetween is made of a ceramic material $M_2$. Material $M_1$ is a steel, for example, as steel possesses a suitable mechanical strength. Contrary thereto, material $M_2$ is thermally and electrically non-conductive and non-magnetic, in other words it is electromagnetically transparent. Material $M_3$ is ferrous, i.e. a steel, for example, so eddy currents induced by means of the inductive heating device 39 may produce eddy current losses by means of which the heating layers 59 can be heated to a desired heating temperature $T_H$. Furthermore, the alternating magnetic field of the inductive heating device 39 causes hysteresis losses to develop in the ferrous material $M_3$, resulting in an additional temperature increase of the heating layers 59.

The component 45 is made of an electromagnetically transparent material $M_4$. The electromagnetically transparent material $M_4$ is non-magnetic and electrically non-conductive. This prevents a temperature increase of the component 45 caused by the alternating magnetic field of the inductive heating device 39. Material $M_4$ is preferably a ceramic material. Material $M_4$ is an oxide ceramic fiber-reinforced composite, for example. An oxide ceramic fiber-reinforced composite combines properties of a metal with those of a ceramics, such as electromagnetic transparency, electric and thermal insulating ability, ductile and non-brittle breaking behavior, high tensile and bending stiffness, thermal shock resistance and high temperature stability up to temperatures above 1300° C.

The conductor 51 is made of an electrically conductive material $M_5$. Preferably, the material $M_5$ is a good conductor of electricity. The material $M_5$ is copper or aluminum, for example.

The hybrid component 43 is produced in layers of the electromagnetically transparent material $M_4$, which forms the component 45, and of the electrically conductive material $M_5$, which forms the conductor 51, in particular in an additive manufacturing process so as to obtain a composite component made of at least two different materials $M_4$ and $M_5$. The conductor 51 has a cross-sectional shape free of hollow spaces and joints. Preferably, the conductor 51 has a non-round cross-sectional shape, which is linear at least partly. The conductor 51 has a rectangular cross-sectional shape, for example. Preferably, the conductor 51 is arranged in such a way that a linear long side of the cross-sectional shape faces the housing bores 11, 12. In regions B between the conductor 51 and the housing bores 11, 12 seen in a direction perpendicular to the rotational axes 16, 17, the component 45 has a material thickness D, with 5 mm≤D≤50 mm, in particular 10 mm≤D≤40 mm, and in particular 15 mm≤D≤30 mm. As the windings W formed by the conductor 51 are in a full surface-to-surface contact with the component 45 and a composite component is formed from the coil 40 and the component 45, the component 45 is not weakened by the arrangement of the coil 40 and has a high mechanical stability. Furthermore, the component is in a full surface-to-surface contact with the outer part 44 except in the region of the through holes 53. This enables the component 45 to reliably absorb forces acting in the radial direction when processing the material 2 to be processed and to dissipate these forces to the outer part 44.

In the inner space 50, the heating zone housing portion 6 is made preferably exclusively of the non-magnetic and electrically non-conductive material $M_4$. The portion of the component 54 located in the inner space 50 is made preferably exclusively of the non-magnetic and electrically non-conductive material $M_4$.

As the outer part 44 is arranged outside the coil 40, only low eddy currents are induced in the outer part 44 by the alternating magnetic field. The outer part 44 is therefore made of a metal material $M_6$. Preferably, the other housing portions 5 and 7 to 9 are made of the metal material $M_6$ as well. The metal material $M_6$ is in particular a steel. Alternatively, the outer part 44 may be made of the material $M_4$ as well. This prevents a temperature increase of the outer part 44 substantially completely.

In order to measure a temperature $T_K$ of the plastic material 2, the screw machine 1 has a first temperature measuring sensor 60. The temperature measuring sensor 60 is arranged on the housing portion 7 at the beginning of the homogenizing zone 26, for example. The screw machine is further provided with a second temperature measuring sensor 62 to measure a flow temperature $T_V$ in the flow line 47 and with a third temperature measuring sensor 63 to measure a return flow temperature $T_R$ in the return flow line 48. The temperature measuring sensors 60, 62, 63 are in signal communication with a control device 61 used to control the screw machine 1 and in particular the inductive heating device 39. To this end, the control device 61 is in particular in signal communication with the energy supply device 41 and the cooling device 42. The control device 61 is in particular used to control the inductive heating device 39 in response to the measured temperature $T_K$, $T_V$ and/or $T_R$.

The screw machine 1 further has a cooling device, which comprises cooling ducts 64 formed in the housing portions 7 and 8. The cooling ducts 64 allow delivery, by means of a coolant pump not shown in more detail, of a coolant in the usual manner. The coolant is in particular water.

The functioning of the screw machine 1 is as follows:

Via the feed opening 22, powdery or pelletized plastic material 2 is fed into the inlet zone 24 of the screw machine 1. In the inlet zone 24, the plastic material 2 is conveyed in the conveying direction 4 up to the heating zone 25.

Figure 2:
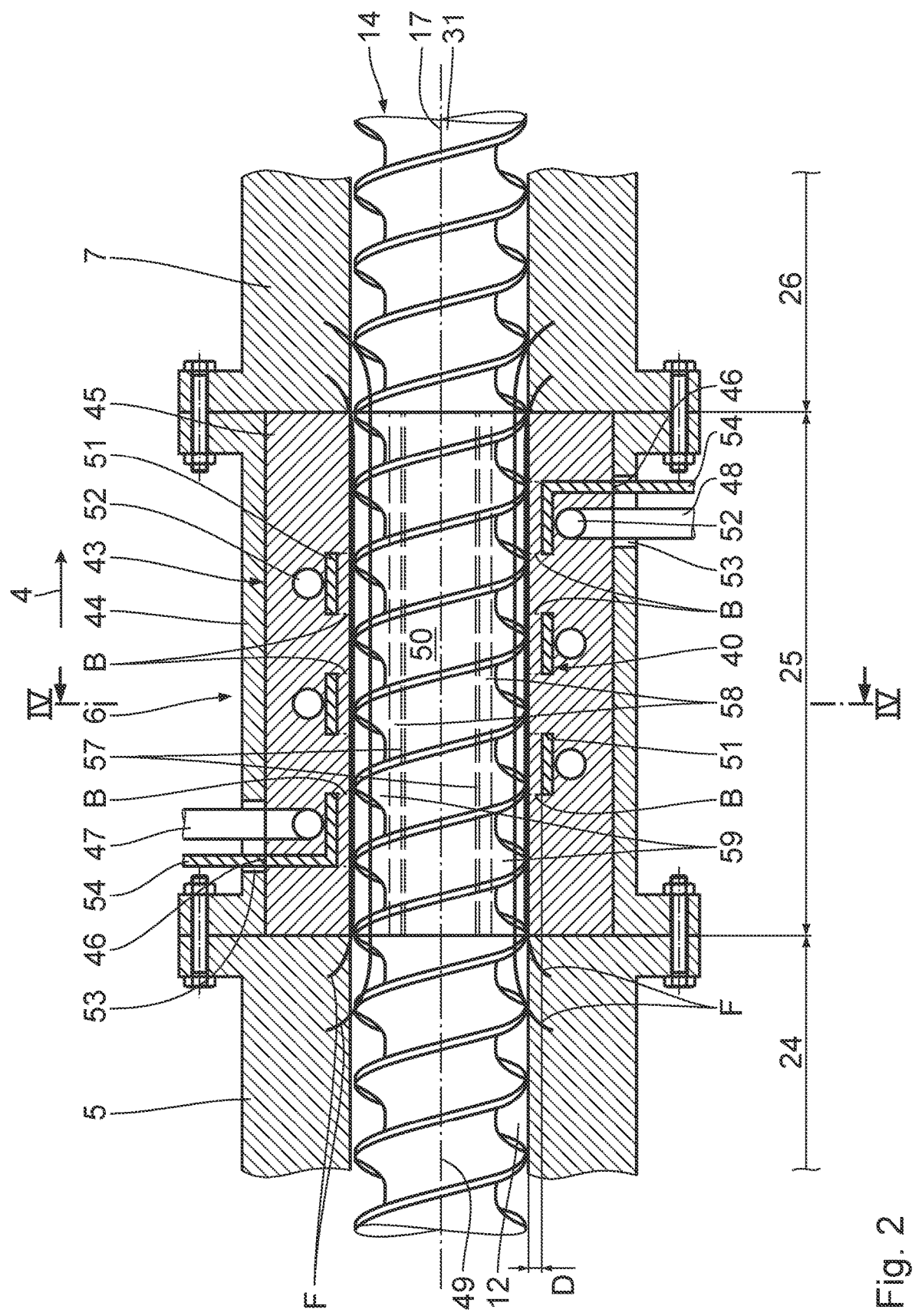
FIG. 2 is an enlarged view of the multi-shaft screw machine in FIG. 1 in a region of an inductive heating device.
Figure 3:
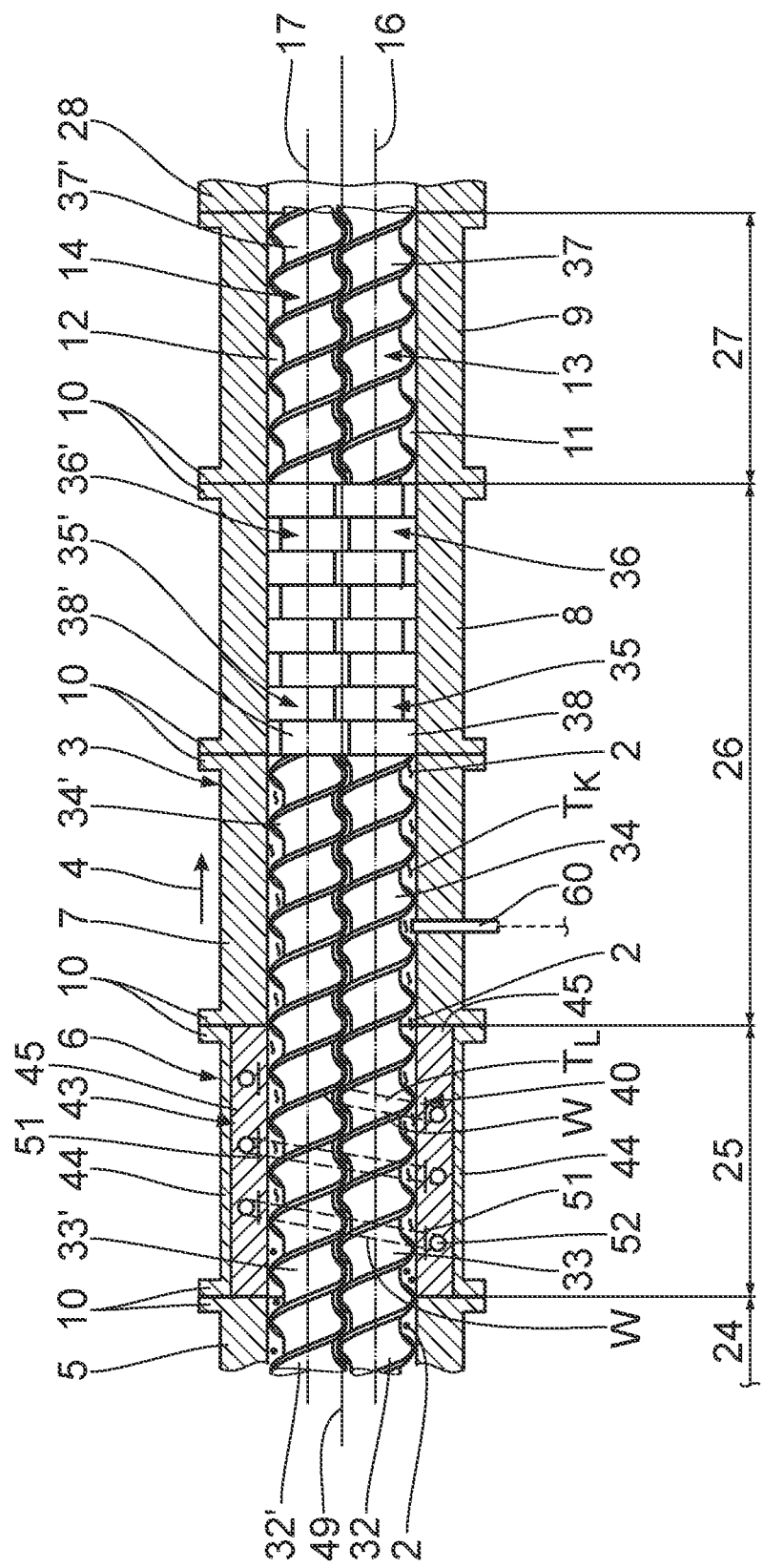
FIG. 3 is a partly sectional plan view of the multi-shaft screw machine in FIG. 1.
Figure 4:
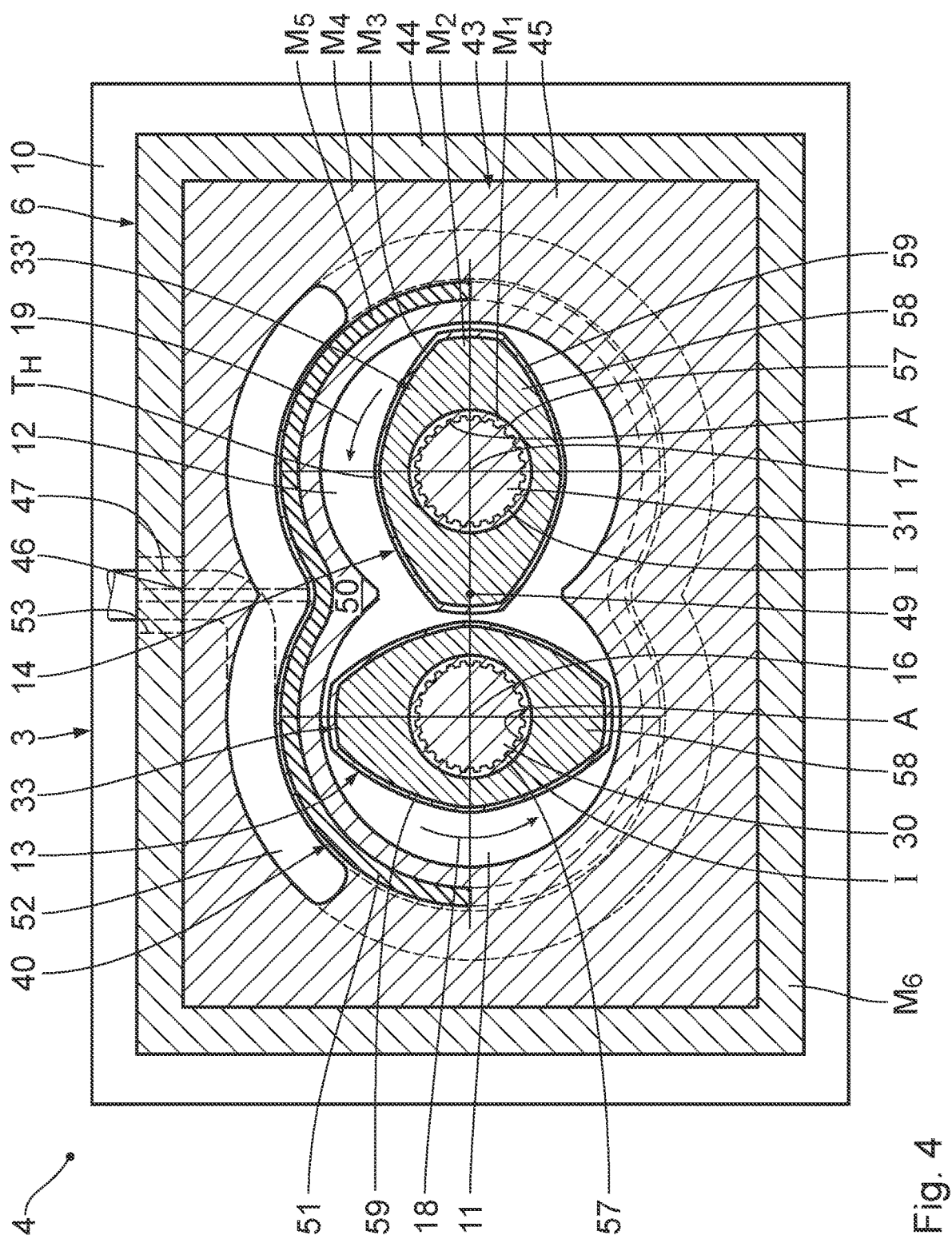
FIG. 4 is a cross-sectional view of the multi-shaft screw machine along section line IV-IV in FIG. 2.

In the heating zone 25, the plastic material 2 is heated by means of the inductive heating device 39. To this end, the inductive heating device 39 generates an alternating magnetic field by means of the energy supply device 41 and the coil 40. The inductive heating device 39 is in particular operated at a frequency f, the frequency f in a first frequency range being such that 1 kHz<f≤50 kHz, in particular 5 kHz≤f≤45 kHz, and in particular 10 kHz≤f≤40 kHz. Furthermore, the frequency f in a second frequency range is such that 140 kHz≤f≤360 kHz, in particular 150 kHz≤f≤350 kHz, and in particular 160 kHz≤f≤340 kHz. Preferably, the inductive heating device 39 is operated in both frequency ranges alternately, with the result that various penetration depths of the alternating magnetic field are achieved. Field lines F of the alternating magnetic field are illustrated in FIG. 2. The concentration of the field lines F is high in the inner space 50 of the coil 40 so the magnetic field strength is high there. The heating layers 59 of the treatment elements 33, 33' further act in the manner of a core. The alternating magnetic field causes eddy currents to be induced in the heating layers 59, the eddy currents producing ohmic eddy current losses. Furthermore, the alternating magnetic field causes hysteresis losses to develop in the heating layers 59. The ohmic eddy current losses and the hysteresis losses lead to a temperature increase of the heating layers 59 to the heating temperature $T_H$. The heating temperature $T_H$ can be changed via the frequency f and/or the amplitude A. Due to the close contact of the plastic material 2 with the treatment element shafts 13, 14, the plastic material 2 is heated by the heating layers 59. The heat generated in the heating layers 59 is therefore transferred to the plastic material 2, causing the temperature thereof to increase in the heating zone 25 up to the temperature $T_K$. The temperature $T_K$ is in particular above a melting temperature $T_M$ of the plastic material 2, causing the solid plastic material 2 to melt at least partly in the heating zone 25.

As the component 45 is made of the electromagnetically transparent material $M_4$, which is non-magnetic and electrically non-conductive, the alternating magnetic field does not produce a temperature increase of the component 45. The energy provided by the inductive heating device 39 is therefore introduced into the plastic material 2 in a simple and efficient manner via the heating layers 59 of the treatment elements 33, 33'. Furthermore, the insulating layers 58 prevent the heat generated in the heating layers 59 from being transferred in the direction of the shafts 30, 31.

As the conductor 51 is free of joints and in particular free of soldering material, this allows the inductive heating device 39 to be operated at a high power as a maximum permissible temperature of the conductor 51 is only limited by a melting temperature of the material $M_5$ and not by a maximum permissible temperature of the soldering material. During the operation of the inductive heating device 39, the temperature of the conductor 51 increases due to ohmic losses and has a temperature $T_L$. The heat loss generated in the conductor 51 is dissipated to the component 45. The inductive heating device 39 is preferably operated such that the temperature $T_L$ of the conductor 51 or of the coil 40 is above the melting temperature $T_M$ of the material 2 to be processed. Preferably, the temperature $T_L$ is above 100° C., in particular above 160° C., and in particular above 230° C. In this manner, the heat loss is transferred, via the component 45, to the material 2 to be processed, causing the material 2 to be processed to be heated from inside via the treatment element shafts 13, 14 on the one hand and from the outside via the component 45 on the other. In this manner, the heat loss of the coil 40 is used for heating the material 2 to be processed as well, with the result that the efficiency of the inductive heating device 39 is improved.

The temperature $T_K$ of the plastic material 2 is measured by means of the temperature measuring sensor 60 and transmitted to the control device 61. The control device 61 compares the temperature $T_K$ with a predefined nominal temperature $T_S$, which is preferably above the melting temperature $T_M$ of the plastic material 2. If the temperature $T_K$ is below the nominal temperature $T_S$, then the control device 61 actuates the energy supply device 41 to increase the amplitude A and/or the frequency f. Conversely, if the temperature $T_K$ is too high, then the amplitude A and/or the frequency is reduced. If necessary, the conductor 51 is cooled. For this purpose, the cooling device 42 pumps a coolant, in particular water or oil, through the cooling duct 52 by means of the coolant pump 56. Measuring the flow temperature $T_V$ and the return flow temperature $T_R$ and measuring the temperature $T_K$ of the material 2 allows one to determine the amount of energy introduced into the material 2 to be processed via the heated treatment element shafts 13, 14 and, potentially, via the heat loss transferred by the component 45. This allows the processing method to be optimized thermally.

In the homogenizing zone 26, the plastic material 2 is homogenized and molten completely in case there is still any solid plastic material 2. If necessary, the plastic material 2 is cooled by means of a coolant, in particular water, which is pumped through the coolant ducts 64.

In the pressure-build up zone 27, the pressure of the completely molten and homogenized plastic material 2 is increased. The plastic material 2 is then discharged via the discharge opening 29.

The screw machine 1 according to the invention allows energy to be introduced into the material 2 to be processed in a simple and efficient manner by induction or heat, thus allowing a mechanical energy input to be reduced significantly, with the result that the mechanical load and the wear of the screw machine 1 are reduced significantly. The efficient energy input further allows an energy-saving operation of the screw machine 1. In relation to a total power of the screw machine 1, the inductive heating device 39 in particular has a heating power of 10% to 90%, in particular of 20% to 80%, and in particular of 30% of 70%. If necessary, the inductive heating device 39 can also be operated at a plurality of different frequencies fat the same time. This allows regions to be heated, which that are disposed at various distances, such as the circumferential heating layers 59.

The composite material of the treatment elements 33, 33' is produced in a 3D printing process followed by subsequent sintering, for example. Methods for producing composite materials or composite bodies of this type are known.

For example, the hybrid component 43 can be produced in layers in an additive manufacturing process, in other words by means of a 3D printing process followed by subsequent sintering. The electromagnetically trans-parent material $M_4$ of the component 45 is a ceramic material, for example. If necessary, the material $M_4$ can be provided with reinforcing particles, in particular reinforcing fibers, and/or with ferrites to increase and direct the alternating magnetic field. The electrically conductive material $M_5$ is, for example, a metal material, a metal material composition and/or an electrically conductive ceramic material. Preferably, the hybrid component 43 is a metal ceramic hybrid component. The hybrid component 43 is in particular designed as a composite component formed of the magnetically transparent material $M_4$ and the electrically conductive material $M_5$.

While specific embodiments of the invention have been shown and described in detail to illustrate the application of the principles of the invention, it will be understood that the invention may be embodied otherwise without departing from such principles.

The invention claimed is:

1. A screw machine, comprising:
 a housing comprising a plurality of interconnected housing portions arranged in succession in a conveying direction;
 at least one housing bore formed in the housing;
 a feed opening leading into the at least one housing bore;
 at least one treatment element shaft arranged in the at least one housing bore such that the at least one treatment element shaft is drivable for rotation about at least one rotational axis; and
 an inductive heating device configured to form a heating zone with at least one coil, wherein the at least one coil surrounds the at least one treatment element shaft, at least one housing portion in the heating zone comprising a component made of a non-magnetic and electrically non-conductive material, the at least one treatment element shaft comprising an electrically conductive material at least in the heating zone, the at least one coil being integrated in the component, and at least one cooling duct being integrated in the component, the at least one cooling duct being formed at a side of the at least one coil facing away from the at least one housing bore.

2. A screw machine according to claim 1, wherein the at least one coil forms in each case a plurality of windings, the windings being surrounded by the component, the at least one treatment element shaft comprising a treatment element shaft longitudinal axis, the housing comprising an outer housing surface, the at least one cooling duct being arranged radially between the at least one coil and the outer housing surface with respect to the treatment element shaft longitudinal axis.

3. A screw machine according to claim 1, wherein the at least one coil forms in each case at least two terminals, the terminals being accessible from an outside of the component.

4. A screw machine according to claim 1, wherein the at least one coil and the component are configured to form a hybrid component, the at least one coil being arranged between the at least cooling duct and at least housing bore.

5. A screw machine according to claim 1, wherein the component forms an inner sleeve, which defines at least a portion of the at least one housing bore in the heating zone.

6. A screw machine according to claim 1, wherein the at least one coil comprises an associated conductor, the component having a material thickness in a region of the conductor perpendicular to the at least one rotational axis, the material thickness being greater than or equal to five millimeters and the material thickness being less than or equal to fifty millimeters.

7. A screw machine according to claim 1, wherein the at least one coil comprises an associated conductor, the conductor having a cross-section free of hollow spaces.

8. A screw machine according to claim 1, wherein the at least one coil defines an inner space and the at least one housing portion is made exclusively of the non-magnetic and electrically non-conductive material in the inner space.

9. A screw machine according to claim 1, wherein the at least one housing portion comprises at least one outer part, and the component is supported against the at least one outer part.

10. A screw machine according to claim 1, wherein a flow line and a return flow line of a cooling device are connected to the cooling duct, and at least one of a flow temperature in the flow line and a return flow temperature in the return flow line is measurable by at least one temperature measuring sensor.

11. A screw machine according to claim 1, wherein the inductive heating device comprises an energy supply device to operate the at least one coil, the energy supply device providing at least one of an alternating voltage and an alternating current.

12. A screw machine according to claim 1, further comprising:
 a temperature measuring sensor configured to measure a measured temperature of the material to be processed; and a control device configured to control the inductive heating device in response to the measured temperature of the material to be processed.

13. A screw machine according to claim 1, wherein the at least one coil comprises a conductor, the conductor forming a plurality of windings and terminals arranged at ends thereof, the windings having a shape of a horizontal figure eight and the windings being adapted to two housing bores.

14. A screw machine according to claim 1, wherein the at least one cooling duct has a shape of a horizontal figure eight and the at least one cooling duct is adapted to one or more of two housing bores and windings of the at least one coil.

15. A method for processing of material to be processed, the method comprising the following steps:
 providing a screw machine comprising a housing including a plurality of interconnected housing portions arranged in succession in a conveying direction, at least one housing bore formed in the housing, a feed opening leading into the at least one housing bore, at least one treatment element shaft arranged in the at least one housing bore such that the at least one treatment element shaft is drivable for rotation about at least one rotational axis and an inductive heating device configured to form a heating zone with at least one coil, wherein the at least one coil surrounds the at least one treatment element shaft, at least one housing portion in the heating zone comprising a component made of a non-magnetic and electrically non-conductive material, the at least one treatment element shaft comprising an electrically conductive material at least in the heating zone, the at least one coil being integrated in the component, at least one cooling duct being integrated in the component, the at least one cooling duct being formed at a side of the at least one coil facing away from the at least one housing bore;
 feeding a material to be processed into the at least one housing bore;
 heating the at least one treatment element shaft via the inductive heating device; and
 heating the material to be processed on the at least one heated treatment element shaft.

16. A method according to claim 15, wherein the inductive heating device is operated such that a temperature of the at least one coil is above a melting temperature of the material to be processed, the at least one treatment element shaft comprising a treatment element shaft longitudinal axis, the housing comprising an outer housing surface, the at least one cooling duct being arranged radially between the at least one coil and the outer housing surface with respect to the treatment element shaft longitudinal axis.

17. A screw machine according to claim 7, wherein at least a portion of the cross-section free of hollow spaces is formed linearly.

18. A screw machine according to claim 11, wherein the at least one of the alternating voltage and the alternating current is provided with an adjustable frequency.

19. A screw machine according to claim 11, wherein the at least one of the alternating voltage and the alternating current is provided with an adjustable amplitude.

20. A method according to claim 15, wherein the at least one treatment element shaft is heated via the inductive heating device until the material has molten at least partly in the heating zone.

21. A method according to claim 16, wherein the temperature of the at least one coil is above 100° C.

22. A screw machine, comprising:
 a housing comprising a plurality of interconnected housing portions arranged in succession in a conveying direction, the housing defining at least one housing bore;
 a feed opening leading into the at least one housing bore;
 a treatment element shaft arranged in the at least one housing bore such that the treatment element shaft is drivable for rotation about at least one rotational axis, the treatment element shaft comprising a treatment element shaft longitudinal axis; and
 an inductive heating device configured to form a heating zone with at least one coil, wherein the at least one coil surrounds the treatment element shaft, at least one housing portion in the heating zone comprising a component made of a non-magnetic and electrically non-conductive material, the treatment element shaft comprising an electrically conductive material at least in the heating zone, the at least one coil being integrated in the component, and at least one cooling duct being integrated in the component, the at least one cooling duct being arranged at a position located radially beyond the at least one coil with respect to the treatment element shaft longitudinal axis.

* * * * *